Patented Aug. 15, 1933

1,922,902

UNITED STATES PATENT OFFICE 1,922,902

ZINC SULPHATE

Edward A. Taylor, Cleveland, Ohio, assignor to The Grasselli Chemical Company, Cleveland, Ohio, a Corporation of Delaware No Drawing. Application January 19, 1931
Serial No. 509,882

4 Claims. (Cl. 23—125)

Zinc sulphate is usually produced for commerce as one of the hydrates containing 6 or 7 mols of water of crystallization.

Attempts to produce zinc sulphate with a lower water content, such as would correspond to about 4 or 5 mols of water of crystallization, have resulted in obtaining products in lump form which dissolve only with difficulty in water.

The amount of water necessary to form a saturated solution of $ZnSO_4$ saturated at the boiling point is greater than that corresponding to 7 mols of water of crystallization; in other words, zinc sulphate hydrates do not melt in their water of crystallization to a clear solution. In the production of zinc sulphate hydrate crystals it is, therefore, necessary to separate the crystals from their mother liquor which, however, sticks persistently to the solid and gives it an undesirable, moist or damp appearance.

My invention is directed to the production of zinc sulphate hydrates in a physical form of easy solubility and of any desired water content.

I achieve this by preparing a magma of a concentrated zinc sulphate solution and crystallized zinc-sulphate monohydrate particles, spreading this magma upon a moving surface, cooling it and removing the product when solidified and breaking it up in the form of flakes.

By varying the concentration of the solution and the amount of monohydrate suspended therein, I can obtain any desired composition of the solid product from about 1 mol of water of crystallization to about 7 mols. The zinc sulphate solidifies in this manner as a conglomerate of crystals of various compositions. The bulk weight of the so obtained flaked product is less than that of a product composed of individual loose crystals. It is easily soluble in water and it is practically free from mother liquor and appears dry.

The most convenient manner of producing my zinc sulphate hydrate flakes is to concentrate a zinc sulphate solution to the desired water content, as for instance, from 44 to 34%, at which concentrations monohydrate has crystallized out, then running this thick slurry, or magma, over an internally water cooled rotating drum so as to form a film of a few milimeter thickness thereon, which solidifies readily, and is scraped off whereby it breaks up into flakes.

I claim:
1. The process of producing zinc sulphate hydrates which consists in cooling to solidify a film of a magma composed of a saturated zinc sulphate solution with solid zinc sulphate monohydrate and breaking up the solidified film into flakes.

2. The process of producing zinc sulphate hydrate flakes which consists in cooling to solidify a film of a magma composed of a saturated zinc sulphate solution with solid zinc sulphate monohydrate containing from about 44 to 34% water, and breaking up the solidified film into flakes.

3. Zinc sulphate hydrate in the form of flaky agglomerates of various zinc sulphate hydrate crystals which are free from mother liquor and easily soluble in water.

4. Zinc sulphate hydrate in the form of flaky agglomerates of various zinc sulphate hydrate crystals which contain an aggregate water content of from 44 to 34%.

EDWARD A. TAYLOR.